Aug. 29, 1961
S. L. TIMMONS
2,998,061
OUTDOOR PROJECTION SCREEN ASSEMBLY
Filed Sept. 2, 1958
4 Sheets-Sheet 2
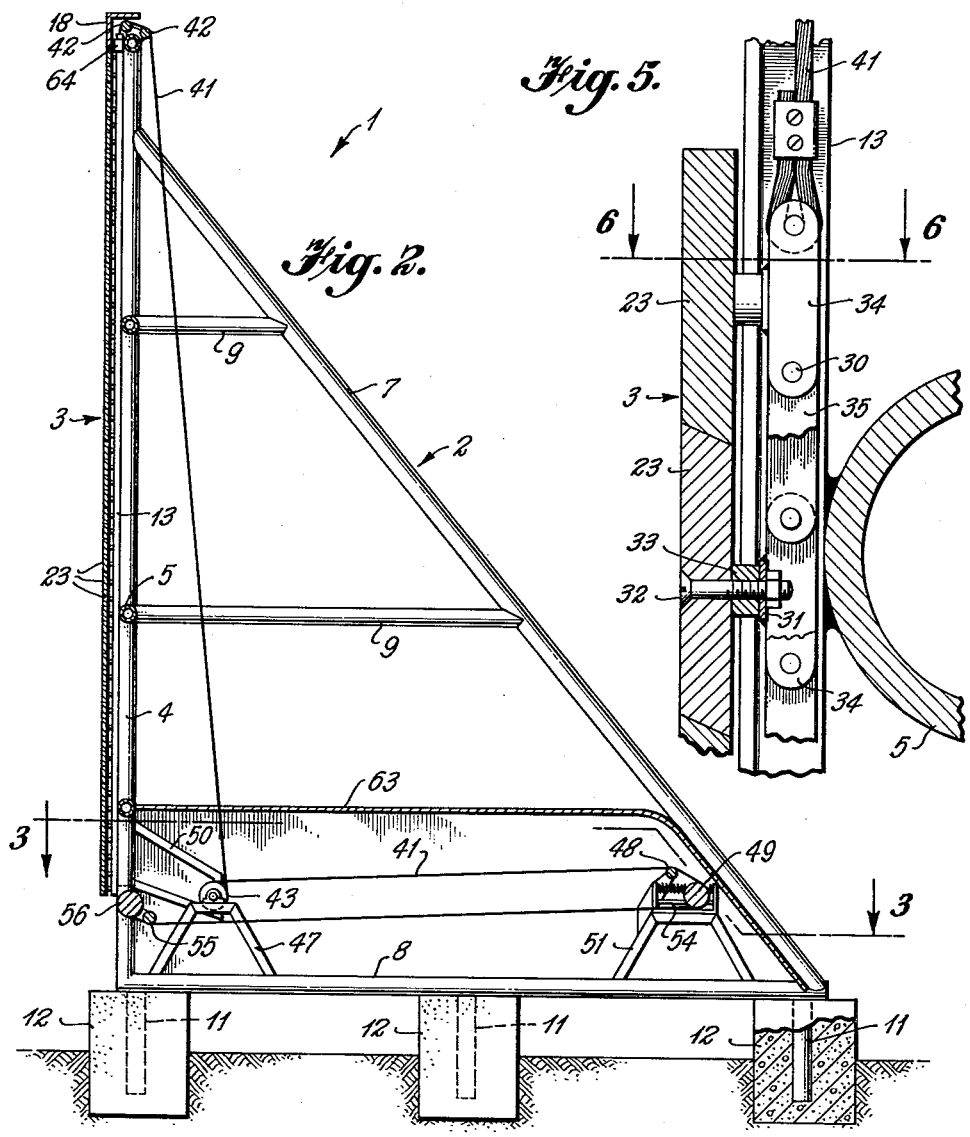
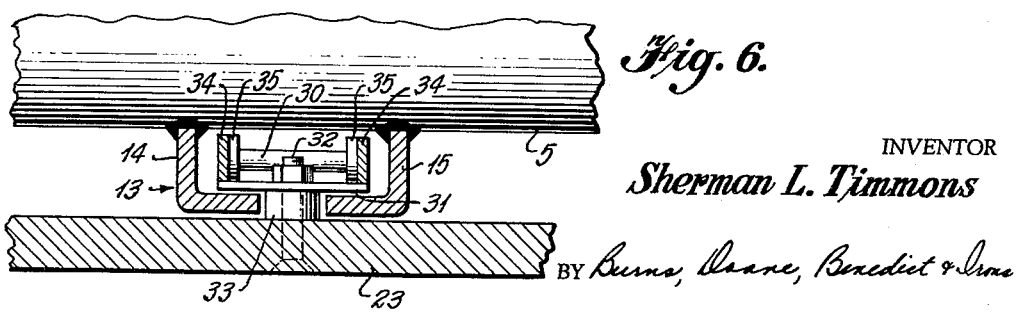
INVENTOR
*Sherman L. Timmons*
BY *Burns, Doane, Benedict & Irons*
ATTORNEYS Aug. 29, 1961  S. L. TIMMONS  2,998,061
OUTDOOR PROJECTION SCREEN ASSEMBLY
Filed Sept. 2, 1958  4 Sheets-Sheet 3

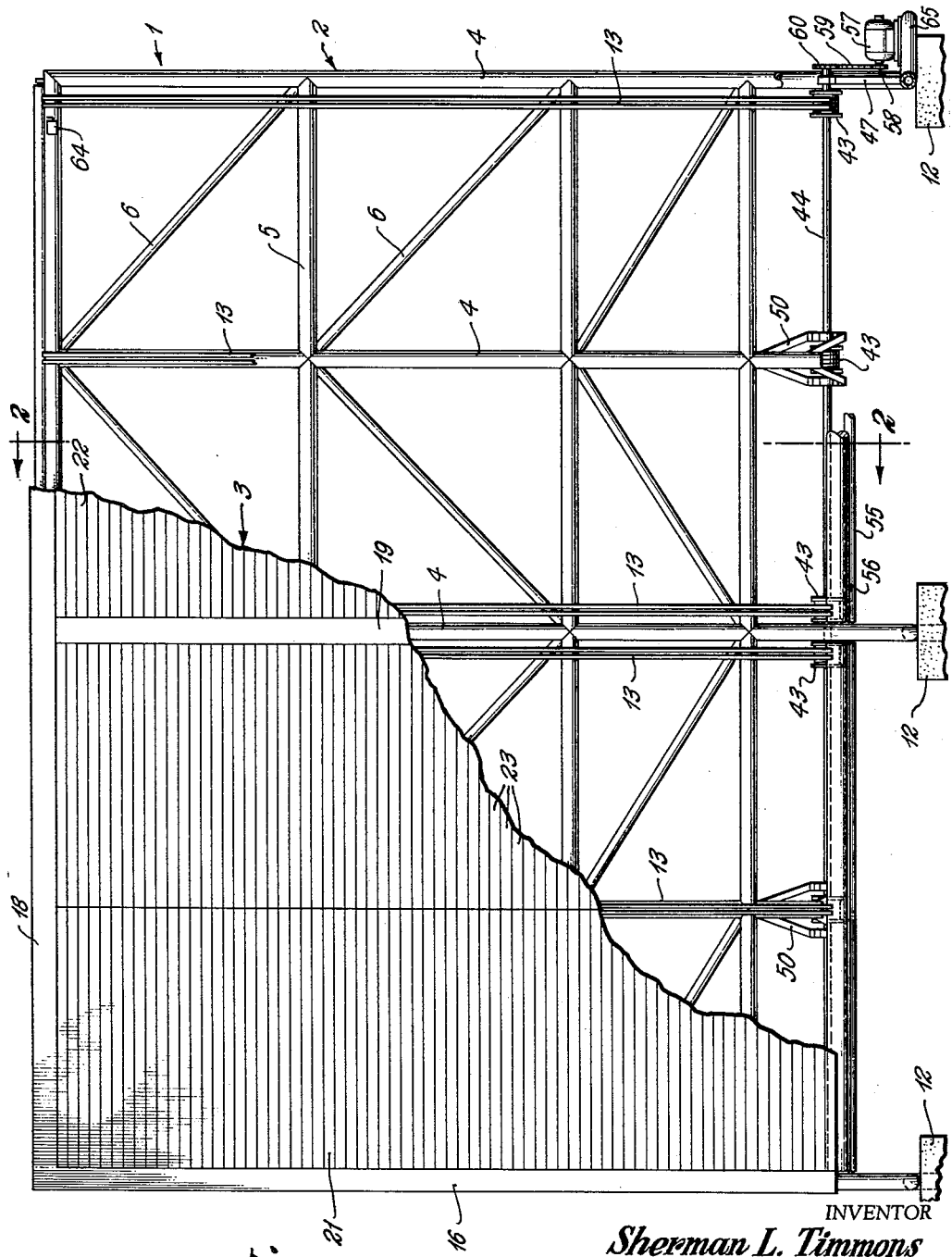

Fig. 3.

Fig. 9.

INVENTOR
*Sherman L. Timmons*

BY *Burns, Doane, Benedict & Irons*

ATTORNEYS

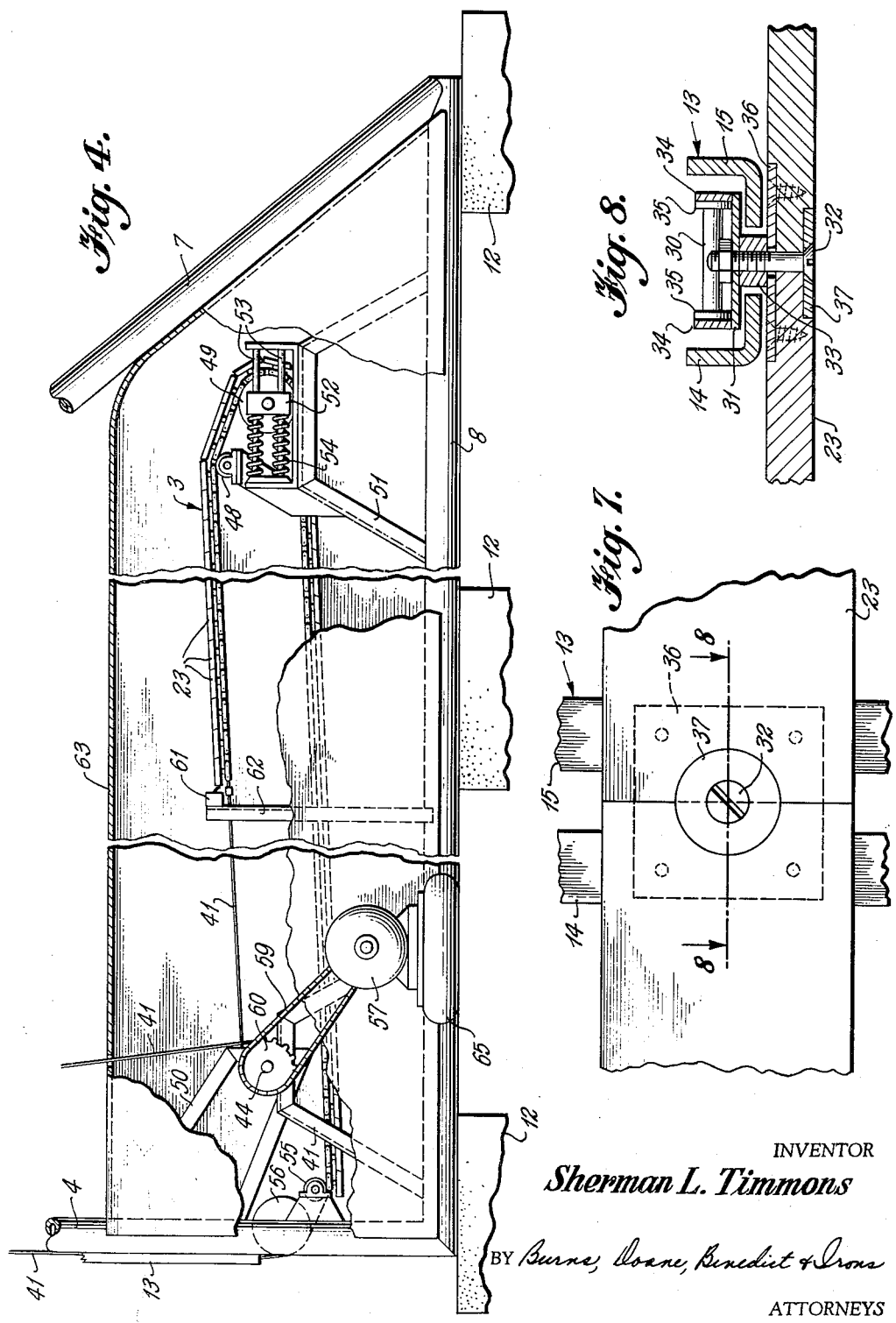

United States Patent Office 2,998,061
Patented Aug. 29, 1961

2,998,061
OUTDOOR PROJECTION SCREEN ASSEMBLY
Sherman L. Timmons, Box 143, Clyde, Kans.
Filed Sept. 2, 1958, Ser. No. 758,880
1 Claim. (Cl. 160—32)

This invention relates to an outdoor projection screen assembly and, more particularly, to such an assembly having a screen which may be selectively moved from an exposed upright viewing position to a retracted protected position for storage.

Outdoor theater screens normally are designed for viewing by persons in automobiles dispersed over a relatively large parking area. In order that the dispersed viewers may see a picture projected onto the screen in clear detail, it is desirable to make the screen substantially larger than normal indoor theater screens which are viewed by closely assembled audiences. Because outdoor screens are so large and exposed to wind forces and the like, the supporting structure must be quite massive to prevent upsetting of the screen or other damage thereto. Moreover, the life of such screens is relatively short when they are constantly subjected to the ravages of weather. Thus, because of the large size of outdoor screns and their short life, they are attended by considerable expense.

It is an object of this invention to provide an improved outdoor theater screen assembly characterized by prolonged screen life due to protection of the screen from the weather during periods of non-use.

It is another object of this invention to provide an improved outdoor theater screen assembly characterized by minimum resistance to wind forces during periods of non-use.

It is a further object of this invention to provide an improved outdoor theater screen assembly wherein the screen may be quickly and easily moved back and forth between an upright viewing position and a retracted protected position.

It is a still further object of this invention to provide an improved outdoor theater screen assembly comprising a new and advantageous combination of structural elements to facilitate selective movement of the screen between an upright viewing position and a retracted protected position.

Broadly, the invention includes an outdoor projection screen assembly which comprises a screen sufficiently large to permit pictures projected thereon to be seen in clear detail by a large gathering of dispersed viewers, a rigid frame permanently mountable on the ground at an exposed outdoor location and having sufficient dimensions and strength to resist upset by high winds and the like and to support said screen in upright viewing position, means to connect said screen to said frame for edgewise movement of said screen along a bent path back and forth between the upright viewing position and a protected retracted position of substantially decreased exposure to the wind relative to said viewing position, said screen being flexible to permit it to follow said bent path during said movement, and power means operatively connected to said screen to effect said movement.

The invention having been generally set forth, a preferred specific embodiment thereof for the accomplishment of the stated objects and others will now be described in detail with reference to the accompanying drawings in which:

FIGURE 1 is a front elevation of the screen assembly;
FIGURE 2 is a vertical sectional view taken along the line 2—2 of FIGURE 1;
FIGURE 3 is a fragmentary horizontal sectional view taken along the line 3—3 of FIGURE 2;
FIGURE 4 is a fragmentary, partially broken-away side elevation showing the screen in protected storage position;
FIGURE 5 is a fragmentary sectional view showing in detail the screen slats and their connection to the frame;
FIGURE 6 is a horizontal sectional view taken along the line 6—6 of FIGURE 5;
FIGURE 7 is a detail of a slat splice; and
FIGURE 8 is a horizontal sectional view taken along the line 8—8 of FIGURE 7.

Depicted in the drawings is an outdoor projection screen assembly designated generally by the reference numeral 1 which comprises an upstanding frame 2 having an open-work superstructure and a screen 3 movably mounted on the front wall of the frame 2 as fully described hereinafter.

The front wall of the frame 2 is defined by an open-work pattern of vertical columns 4 which are connected at spaced locations by girts 5 and diagonal framing members 6. The front wall is retained against horizontal bending by a plurality of prop members 7, the tops of which are connected to the columns 4 and the bottoms of which are connected to the rear ends of horizontal base members 8. The front ends of the horizontal base members are connected to the bottoms of columns 4 to form a rigid, generally triangular frame. The prop members 7 are further connected to the columns 4 by a plurality of horizontal braces 9 to increase the rigidity of the frame. Extending downwardly from the base members 8 are a plurality of legs 11 which are encased in concrete footings 12. Preferably, the various members of the frame described above comprise circular pipe sections welded or otherwise connected together to form a rigid unitary structure. It is important that the frame be sufficiently large and strong to resist upset by high winds and the like and to support in upright viewing position a screen which is sufficiently large to permit pictures projected thereon to be seen in clear detail by a large gathering of dispersed viewers such as is common to outdoor drive-in theaters where the vehicles are spread over a large area in view of the screen. It will be apparent that the frame may be constructed of many different structural shapes arranged in many different patterns to achieve the necessary strength and stability.

To permit vertical, edgewise movement of the screen along the front face of the frame, a plurality of tracks 13 are connected in vertical position to the front of the frame 2 as by welding. As best seen in FIGURE 6, each of the tracks 13 comprises a pair of angles 14 and 15 each having one leg welded to the girts 5 and extending outwardly therefrom with the other leg of each of the angles extending inwardly to define a socket between the angles. The angles are spaced apart to leave an opening between the opposed, inwardly extending legs.

Also connected by any suitable connections to the front wall of the frame 2 are a plurality of facing members which preferably comprise flat wooden boards. Facing members 16 and 17 are situated at the opposite sides of the frame with facing member 18 extending therebetween at the top of the frame. An additional facing member 19 extends down the center front of the frame.

The screen 3 is divided into a pair of sections 21 and 22. The screen section 21 is disposed between the facing members 16 and 19 and the screen section 22 is disposed between the facing members 19 and 17. Each of the screen sections comprises a plurality of relatively narrow slats 23 which are flexibly connected together in vertical alignment and in contiguous edge-to-edge relationship to present a substantially continuous viewing surface when the screen is in its normal upright viewing position. Preferably, the slats comprise wooden boards with their front faces surfaced in any well-known manner to enhance the viewability of pictures projected onto the screen.

As shown in FIGURE 5, the top and bottom edges of each of the slats are inclined from the normally vertical face of the screen. As shown in FIGURE 3, the side edges of the slats and the opposing edges of the facing members 16, 17 and 19 are also inclined relative to the front of the screen. Although the slats are placed in abutting relationship to minimize the transmission of light therebetween, inevitably the connections between the slats are opened by warping of the slats and the like to transmit some light from rear to front through the screen. By virtue of the inclined slat edges, however, the light which passes between the slats is transmitted away from the viewers rather than toward them. Preferably, the upper and lower edges of the slats are inclined downwardly from the slat fronts so that such light rays are transmitted upwardly over the heads of the viewers.

Each screen section also includes flexible connections between adjacent slats as shown in FIGURE 5. A small metal bar 31 is attached in parallel relationship with the slat by a bolt 32 and is spaced from the slat by a spacer 33. Connected as by welding to the ends of the bar 31 are a pair of chain links 34. Pivotally connecting adjacent links 34 by means of pins 30 are connector links 35. The links 34 and 35 are connected in a line to form a chain slide which is received within the socket of one of the tracks 13. To insure the lateral stability of the slats, three sets of flexible connections are provided for each of the screen sections with one set of connections at each end and one set at the middle of each section. Three corresponding tracks 13 are provided for each screen section as shown in FIGURE 1.

Since the slats 23 are quite lengthy, it is preferred that each slat be made up of two lengths of board which are connected at the center as shown in FIGURES 7 and 8. A gusset plate 36 is connected by screws to the inner ends of the two slat lengths which are disposed in abutting relationship. On the outer face of the juncture between the slat lengths a countersunk washer 37 is disposed. The slats are then connected at such juncture to a pair of links 34 of the chain slide by bolts 32, spacers 33, and bars 31 as previously described.

A cable 41 is connected by a suitable connection to the top of the screen 3 as shown in FIGURE 5 and extends upwardly over a pair of sheaves 42 which are mounted at the top of the frame 2. A total of six cables 41 are provided with one cable being connected to the top of each of the chain slides. The sheaves 42 may be either individual pulleys for each cable or elongated rollers which coact with a plurality of cables. The cables 41 extend downwardly from the sheaves 42 behind the front wall of the frame to six cable drums 43 with one drum for each cable. The drums 43 are nonrotatably fastened to an elongated axle 44 which extends parallel to the screen and is journaled in bearings 45 and 46. Each of the bearings 45 is mounted on a bracket 50 which is connected as by welding to a column 4. Each of the bearings 46 is mounted on a bracket 47 which is welded or otherwise connected to and extends upwardly from a base member 8.

From the cable drums 43, each of the cables 41 extends rearwardly over a roller 48 and around a take-up roller 49. The rollers 48 and 49 are journaled in suitable bearings mounted on brackets 51 which are welded or otherwise connected to the base members 8. The roller 49 is journaled in bearings 52 which are slideably positioned on rods 53 and biased rearwardly by springs 54 situated between the bearing 52 and the bracket 51. Thus, the take-up roller 49 is urged rearwardly by the springs to remove any slack which may be present in the cable.

From the take-up roller 49, each of the cables 41 extends forwardly around rollers 55 and 56 which are journaled in suitable bearings connected to the front wall of the frame 2. From thence, each cable 41 is connected to the bottom end of one of the chain slides of the screen 3 by a connection similar to that shown in FIGURE 5. Thus, the cables 41 and the various sheaves, cable drums and rollers form a cable and pulley means for effecting edgewise movement of the screen.

Movement of the cable 41 is effected by an electric motor 57 which is connected by drive sprocket 58 (FIGURE 1), chain 59 and sprocket 60 which is rigidly attached to the end of axle 44 which drives the cable drums 43. The motor 57 is supported on a stand 65 welded to the frame 2. If desired, the motor 57 may be connected to the axle 44 through a suitable gear reduction unit.

The motor 57 is reversible and is connected by any suitable electrical circuitry (not shown) to a power source, to appropriate starting switches to actuate the motor in either direction, and to limit switches 61 and 64 which are actuated by the screen to stop the motor 57 as fully described below. When the screen is in its normal upright viewing position as shown in FIGURE 2, the motor 57 may be started in one direction to move the cable 41 in a counterclockwise direction as viewed in FIGURE 2 to move the screen 3 vertically downwardly along the face of the frame and along a bent path around the rollers 56 and 55 and from thence horizontally to and around the take-up roller 49 and the roller 48 until the lower end of the screen strikes the limit switch 61 to stop the motor. The limit switch 61 is mounted on a suitable bracket 62 affixed to one of the base members 8 at a location where such switch will be actuated by the lower end of the screen 3 when the upper end of the screen 3 has passed the roller 56 and thus is completely within the frame 2 in retracted protected position. A housing 63, which is constructed of any suitable weather-tight material and is substantially smaller in height and thus vertical area than the frame 2, is connected as by welding to the frame 2 to completely envelop the screen 3 when it is in its retracted position. As shown in FIGURE 2, the cable 41 extends through the housing to move the screen to such retracted position. When the screen is in its retracted position, only the open-work superstructure of the frame 2 and the relatively small vertical area of the housing 63 are exposed to the force of the wind. Accordingly, since the screen may be retracted during bad weather, the frame 2 need not be designed to withstand the force of stormy winds acting against the screen when in viewing position. Moreover, screen life is materially prolonged by non-exposure to inclement weather.

When the screen is to be moved from its retracted to its viewing position, the motor 57 is actuated in a reverse direction to move the cable in a clockwise direction as seen in FIGURE 2, thus moving the screen forwardly and upwardly along the tracks 13 until the screen is fully positioned in its normal upright viewing position, at which time the top of the screen strikes a limit switch 64, which is mounted by a suitable connection at the top of the frame 2, to stop the motor. Thus, the operator, in order to move the screen from the viewing to the retracted position or from the retracted to the viewing position, need only press the appropriate starting switch to actuate the motor and move the screen until it strikes the appropriate limit switch at the end of its travel, thus stopping the motor. Suitable safety devices preferably are built into the electrical circuitry to prevent actuation of the motor in a direction to move the screen upwardly when it is in viewing position or in a direction further to retract the screen when it is in retracted position, even though the wrong starting switch should be closed.

If desired, the tracks 13 may be extended into the housing 63 over all or a portion of the line occupied by the screen in its retracted position, thereby further facilitating movement of the screen. Further, additional supports may be provided to support the screen while in retracted position.

A preferred specific embodiment of the invention has been illustrated and described. It will be understood, however, that various modifications may be made by persons skilled in the art without departing from the invention, the scope of which is determined by the appended claim.

I claim:

An outdoor motion picture projection screen assembly comprising a frame having an open-work superstructure and legs permanently embedded in the earth to provide minimum wind resistance and maximum stability of said frame, said frame having a vertical front face, a plurality of vertically extending, parallel tracks secured to said front face, each of said tracks forming a vertical channel having a vertical slot in its forward edge, a flexible member vertically movable in each of said channels, spacer members secured to and extending forwardly from said flexible members through said slots, a screen in front of said tracks comprising a plurality of horizontal slats in edge-to-edge vertical alignment, each of said slats having its rear face attached to the forward ends of spacer members secured to a plurality of said flexible members, a roofed, screen storage compartment extending rearwardly from the front face of said frame along the lower portion thereof, said compartment having an opening at its forward end, first horizontal roller means along said front face of said frame vertically below the lower ends of said tracks and in front of said front opening to said storage compartment, second horizontal roller means parallel to said first roller means and positioned in the rear portion of said compartment, third horizontal roller means positioned between and parallel to said first and second roller means, fourth horizontal roller means parallel to and vertically above said first roller means at the upper ends of said tracks, said flexible members extending through said vertical channels and in sequence beneath said first roller means, behind and over said second roller means, around said third roller means and over said fourth roller means, and driving means for driving one of said roller means in one direction to lower said screen from said front face beneath said first roller means and partially around said second roller means to store said screen within said compartment between said first and third roller means, said driving means including means for driving such one roller means in the opposite direction to move said screen from said storage compartment back to projection position along said front face of said frame, said spacer members spacing said slats from the peripheries of said roller means and causing lateral separation of said slats as said slats pass said first and second roller means.

References Cited in the file of this patent

UNITED STATES PATENTS

| 113,202 | Peake | Mar. 28, 1871 |
| 1,063,997 | Moravec | June 10, 1913 |
| 1,182,874 | Haneklans | May 9, 1916 |
| 1,231,233 | Bertram | June 26, 1917 |
| 2,746,187 | Ennever | May 22, 1956 |

FOREIGN PATENTS

| 543,105 | Great Britain | Feb. 10, 1942 |